United States Patent [19]

Strain

[11] 3,922,225
[45] Nov. 25, 1975

[54] SEA-WATER OIL SPILL CLEANING SYSTEM

[76] Inventor: Patrick J. Strain, 27 Tanglewood Drive, Lynwood, Ottawa, Ontario, Canada

[22] Filed: Feb. 19, 1974

[21] Appl. No.: 443,742

[52] U.S. Cl. .............................................. 210/242
[51] Int. Cl.² ....................................... E02B 15/04
[58] Field of Search ............... 210/83, 242, DIG. 21

[56] References Cited
UNITED STATES PATENTS

| | | | |
|---|---|---|---|
| 3,369,664 | 2/1968 | Dahan | 210/DIG. 21 |
| 3,578,171 | 5/1971 | Usher | 210/DIG. 21 |
| 3,651,943 | 3/1972 | Di Perna | 210/242 |
| 3,684,095 | 8/1972 | Ayers | 210/DIG. 21 |
| 3,726,406 | 4/1973 | Damberger | 210/DIG. 21 |
| 3,744,257 | 7/1973 | Spanner | 210/DIG. 21 |
| 3,752,317 | 8/1973 | Lithen | 210/DIG. 21 |
| 3,754,653 | 8/1973 | Verdin | 210/DIG. 21 |
| 3,844,944 | 10/1974 | Mercuri | 210/83 X |
| 3,847,816 | 11/1974 | Di Perna | 210/242 |

*Primary Examiner*—Theodore A. Granger
*Attorney, Agent, or Firm*—C. C. Kent; K. M. Hill

[57] ABSTRACT

The invention is apparatus for cleaning up oil-spills. It comprises effecting a first separation externally of the ship at the bow, and conveying the oil into the ship for a second separation through an elongated baffled conduit. Oil in excess of the ship's capacity may be discharged at the stern into waiting tankers. Intake means which may heat the oil and include when necessary surrounding wave-damping means connected to the ship's bow communicate flexibly with the ship's interior. One embodiment of the intake means is a wide shallow funnel. Novel for shallow coastal water oil skimming is a floating box having a water-level weir through which oil enters and a discharge port connected to a long flexible conduit communicating with a ship of substantial draft standing off in deep water. Mobile means such as shore tractors and powered boats tied to each box on the land side hold it in position and move it as desired.

1 Claim, 16 Drawing Figures

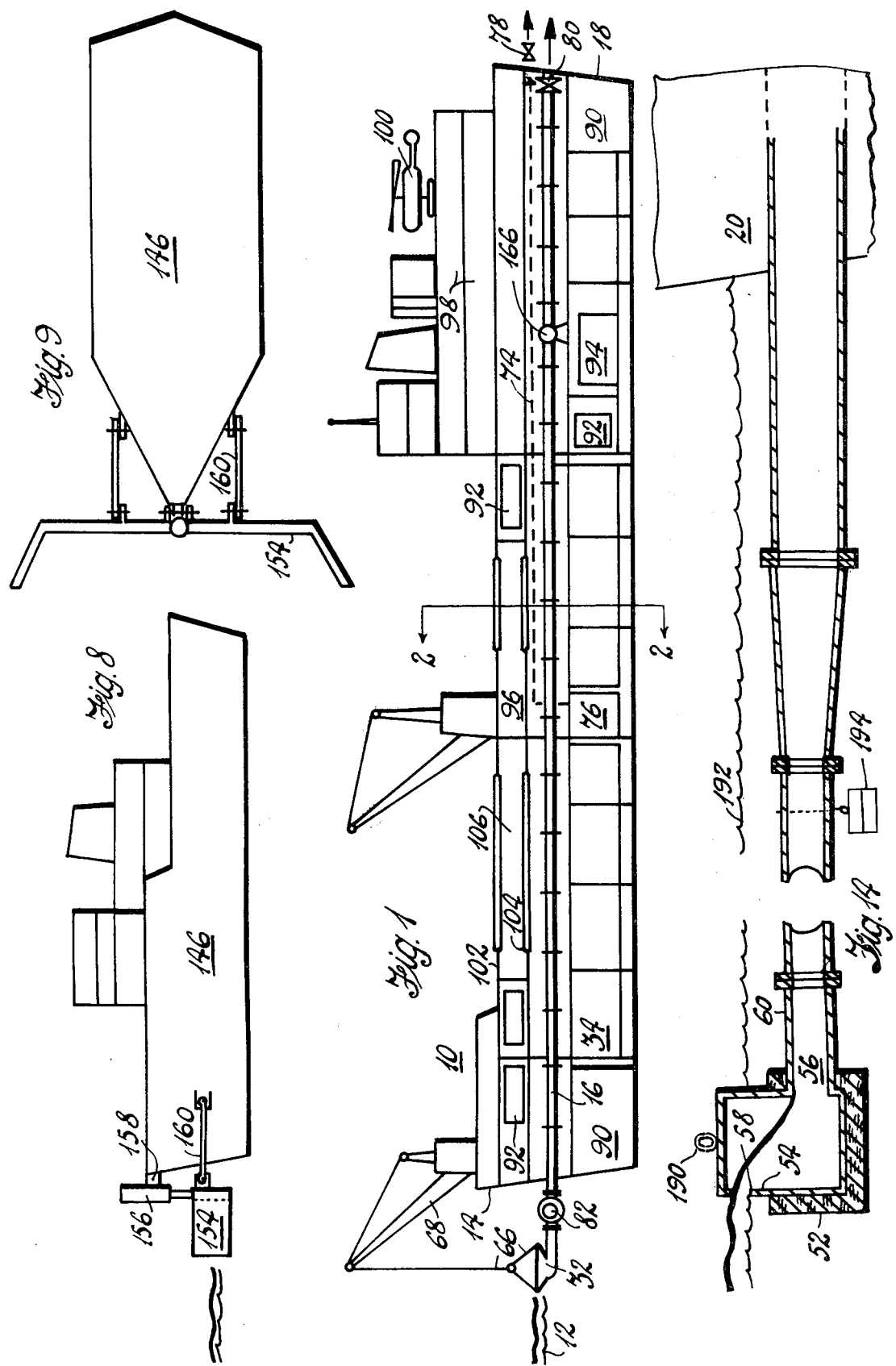

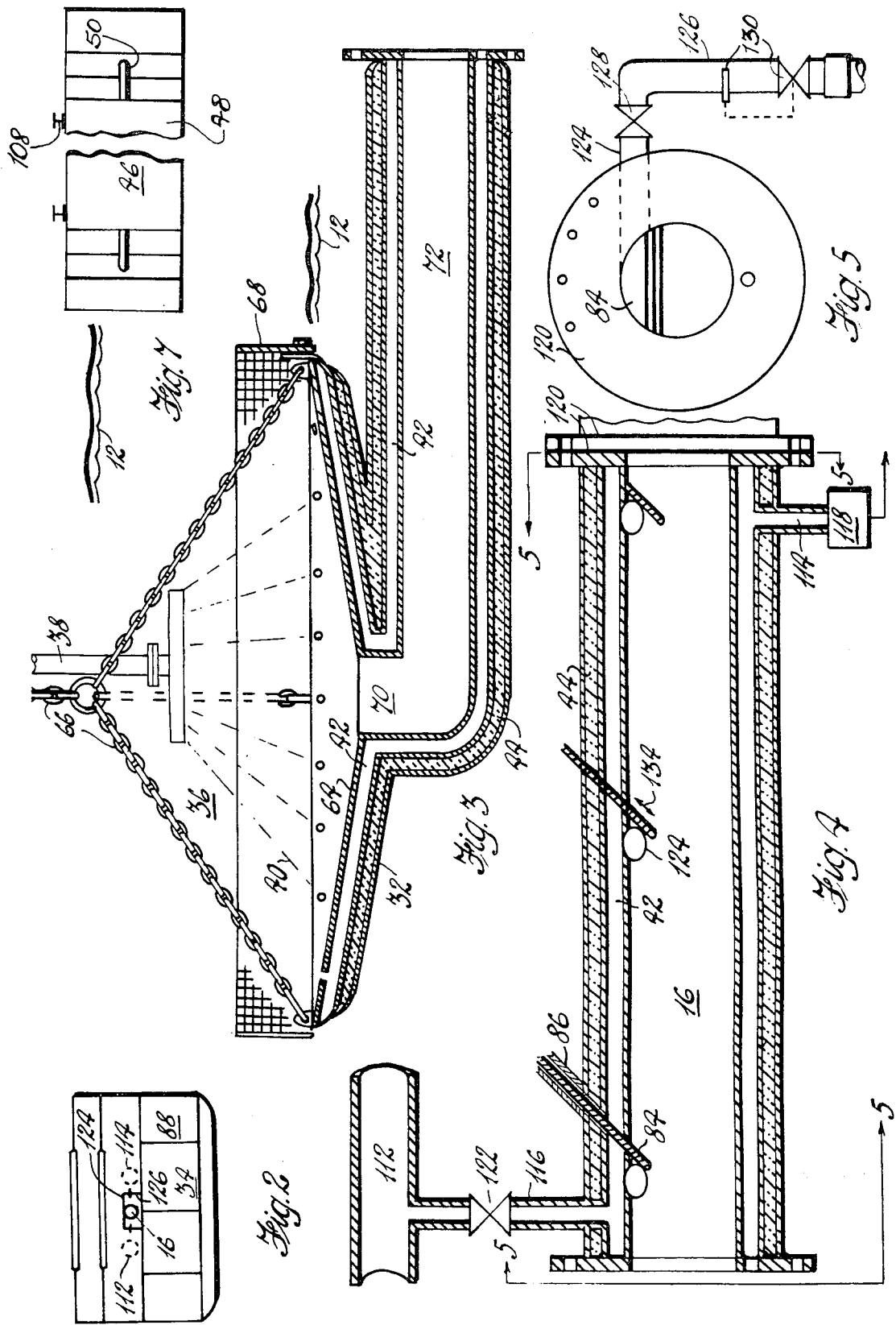

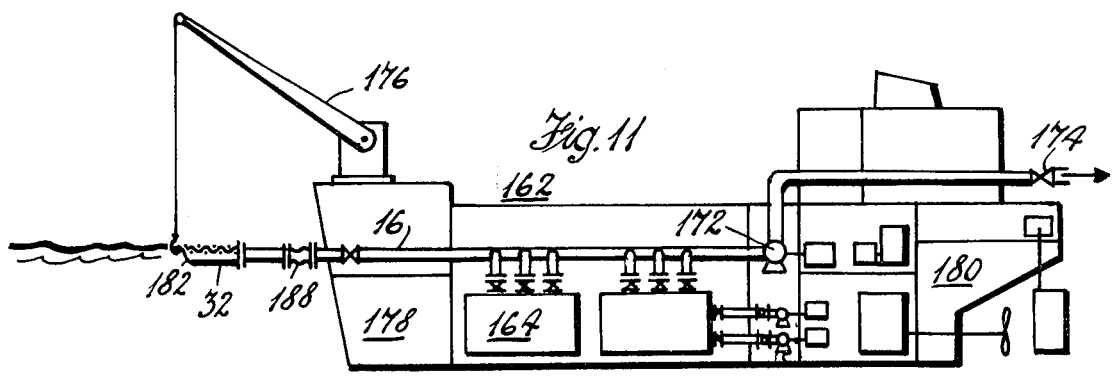
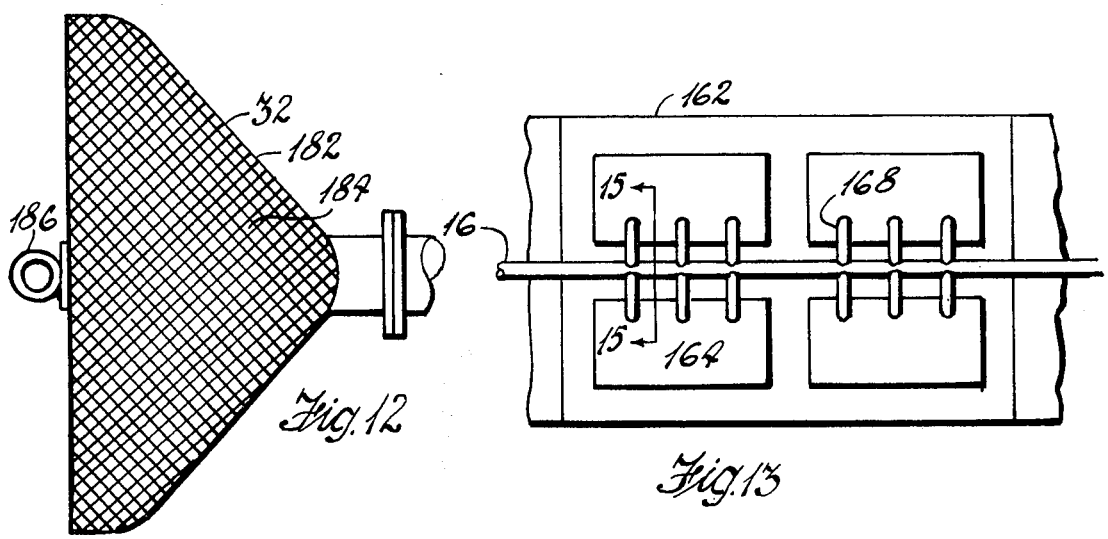
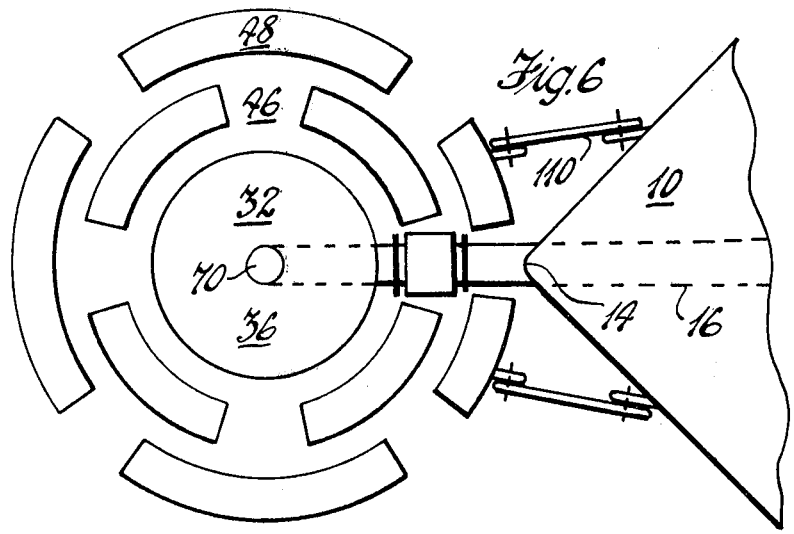

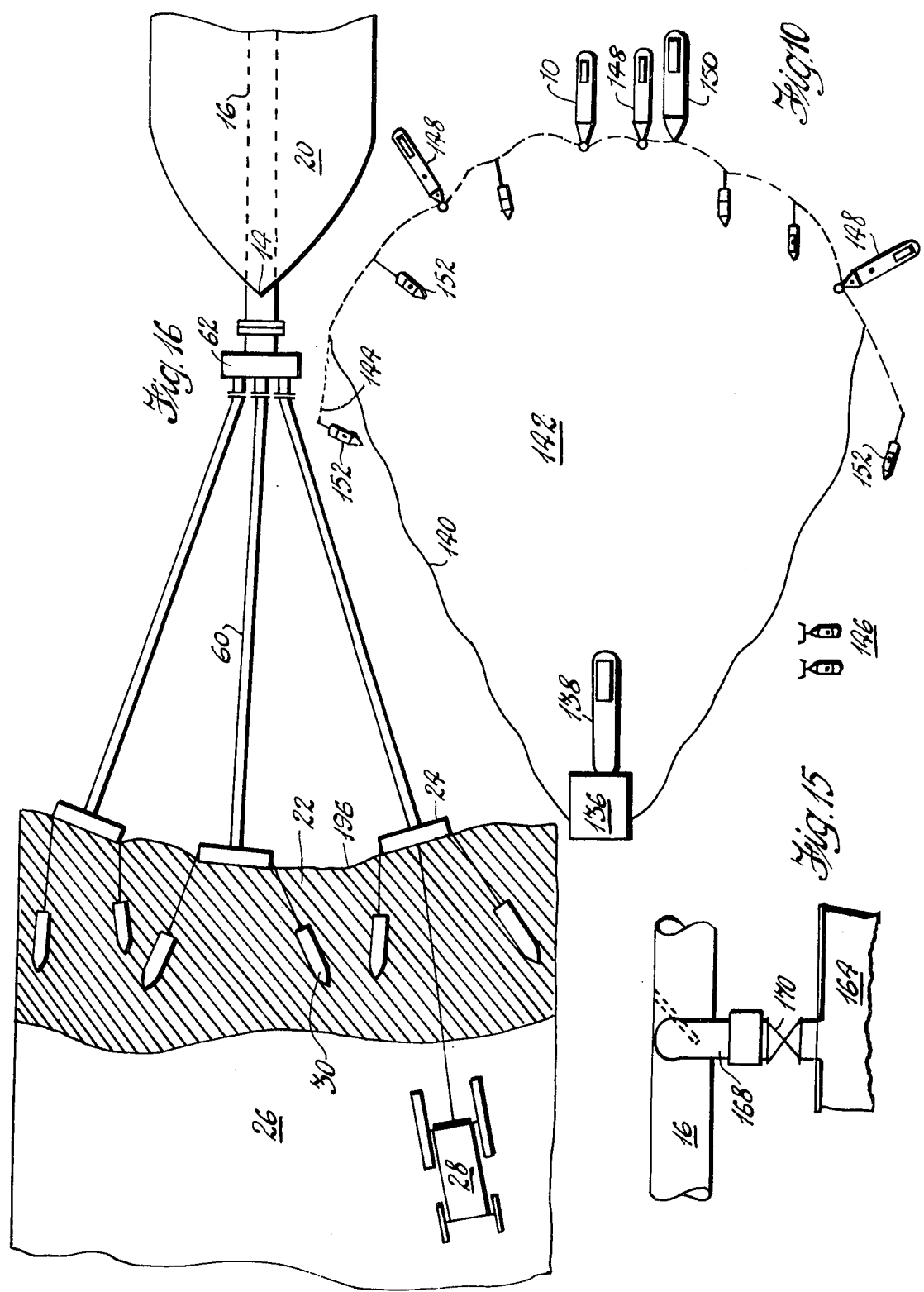

3,922,225

SEA-WATER OIL SPILL CLEANING SYSTEM

FIELD OF THE INVENTION

The present invention is concerned with oil spillages at sea as from ships and drilling platforms and, as a system the invention is believed to be particularly adapted in principle to very large oil spills with the cleaning up of same and recovery of a large proportion of the spilled oil in all but the worst weather conditions.

DESCRIPTION OF THE PRIOR ART

U.S. Pat. No. 2,891,672 discloses an external oil intake at one end of an oil barge which is divided into three compartments wherein settlement of the water to the bottom and its discharge takes place progressively from the intake end to the opposite end. U.S. Pat. No. 1,591,024 shows a barge with a deck mounted separating tank at the stern end. U.S. Pat. No. 2,876,903 is a tank-scow in which oil is separated from water by bulk floatation means. U.S. Pat. No. 2,908,393 is an oil separator raft wherein water surface oil appears to be processed and separated within the raft such oil within the raft being also at sea level so that it appears to operate by enclosing volumes of oil covered sea water as might a fence having mechanism therewithin and a suitable floor and superstructure for supporting and operating such mechanism.

U.S. Pat. No. 3,578,171 separates oil from water by vacuum means and draws up the oil into a deck superstructure for subsequent settlement in settling tanks. U.S. Pat. No. 3,219,190 utilises a transverse rotatable blade assembly for lifting oil into a hold where it is forced upwardly to be ejected into an associated tank-barge or the like.

The problems involved in the above prior art which are solved by applicant's invention may be subsumed by the general indication that all are in one way or another concerned only with small volume oil reclamation and would be unacceptable in principle for oil spills of the tanker "Torrey Canyon" class which is believed to have been carrying appproximately 90,000 tons of oil when she grounded causing a partial national emergency in both England and France a few years ago. Since then oil tanker have increased in size to 500,000 tons dead weight in the immediate future with proposals for one million tons. With such tonnages afloat ways must be found to handle large scale spills when they occur.

SUMMARY OF THE INVENTION

The invention consists of the disclosed funnel or collecting box and conduit conveying system in association with large pollution control ships in which the sea level oil is flowed by gravity or else suction-pumped from the sea with as little water as possible in a first separating step and then further separated in a second separating step by flow straight through a main separation tube extending from bow to stern and amidship with baffling means therein to direct oil off to starboard and port into oil separation tanks. If it is not desired to fill the tanks of the control ship or if they are already filled or if such tanks are not provided the aforesaid baffled flow-through system can be utilised to by-pass separated oil to waiting tankers either alongside or astern of the control vessel.

It is an object of the invention to provide means whereby it is expected that a ship suitably equipped may be capable of cleaning the sea after a major oil spill of crude, bunker C or diesel oil at the rate of at least 1,000 tons per hour as against present methods which it is believed can only deal with approximately 30 tons per hour. In effecting such a cleaning operation means may be provided whereby the oil spill may be contained or fenced in whereby the sea around the oil draw-off operation may be maintained relatively calm. Thus oil may be pushed and accumulated in the area of the principal oil-removing or control ship already referred to. Such operations appear to be economically feasible having regard for the very great expense in product and amenities involved in major oil spills.

With the considerations and inventive objects herein set forth in view, and such others as may become apparent from consideration of this disclosure and specification, the present invention consists of and is hereby claimed to reside in the inventive concept which is comprised, embodied, embraced or included in the construction, composition, arrangement or combination of parts, or new use of any of the foregoing herein exemplified in one or more specific embodiments of such concept, reference being had to the accompanying Figures in which:

FIG. 1 is a longitudinal sectional elevation of the principal pollution control or reclamation vessel.

FIG. 2 is a transverse cross-section on the line 2—2 of FIG. 1.

FIG. 3 is a cross-sectional representation of the intake means or first separation tube funnel and associated parts.

FIG. 4 is a longitudinal cross-section of the separation tube of FIG. 3.

FIG. 5 is a transverse cross-section on the line 5—5 of FIG. 4 but ignoring the oil by-pass to the tank and associated valves and the like.

FIG. 6 is a plan view of a wave damper as intended to be positioned about the funnel of FIG. 3.

FIG. 7 is a side elevation of FIG. 6.

FIG. 8 is a side elevation of a scraper-equipped tug.

FIG. 9 is a plan view of FIG. 8.

FIG. 10 is a pictorial schematic representation of the scene of a super tanker collision with an oil-drilling platform some 12 hours after the event showing the edge of the oil slick and a possible buoyed sea-fence connected to tugs whereby the slick might be contained and perhaps gathered into a gradually diminishing area under the influence of the shown tugs and other vessels such as of FIG. 9.

FIG. 11 is a longitudinal cross-section of a smaller ship than that of FIG. 1 but depicting essentially the same basic system as has already been disclosed.

FIG. 12 is a plan view of the form of bow suspended first intake means or funnel for admitting and separating oil from sea water externally of the ship.

FIG. 13 is a plan representation of the disposition of the storage tank and oil by-passes or branches from the main separation tube.

FIG. 14 is a longitudinal cross-sectional representation of an alternative form of first intake means in the form of a collecting box including an oil intake weir and elongated associated conduits to a deep draft vessel.

FIG. 15 is a detail in elevation exhibiting the relative location of a baffle to the form of by-passes or branches to the oil storage tanks, on the line 15—15 of FIG. 13.

FIG. 16 is a pictorial representation of the manner of use of the system employing the collection boxes depicted in FIG. 14.

In the drawings, like characters of reference designate similar parts in the several Figures.

PRELIMINARY DESCRIPTION

In terms of a process, the invention is that of the ship-based extraction of oil at one end of the ship 10 at sea level 12 after oil spills, including the steps of (i) effecting a first separation of the oil from sea water at sea level externally of the ship (and preferably suspended in advance of the bow per FIG. 1), and (ii) conveying the separated oil and excess sea water, the sea water which has not been separated in the first separation, from said end into and through an elongated oil baffling conduit 16 for effecting a second separation of the oil from the water.

The process also includes discharging excess water from the opposite (and preferably the stern 18) end of the ship. It also includes the step of storing oil in the ship preferably after the second separation thereof in the separating conduit 16. The first separating step also includes damping waves in the area of the first separation when necessary. It also includes heating the oil during the first and second separations. The process also includes shallow coastal waters oil extraction in which a ship 20 (FIGS. 14 and 16) of substantial draft stands off in relatively deep water a distance from the site of the first separation in relatively shallow water, sea-level oil 22 being first-separated by separating means 24 held in location between ship 20 and the shore 26 by mobile anchoring means such as 28 and 30 on the land side of the separating means.

As apparatus the invention includes intake means 32 for effecting the aforesaid first external separation and the aforesaid storage takes place in tanks 34. Means 36 in the form of the steam header 38, diverging tubes 40, steam jacketing 42, (FIGS. 3 and 4) constituting part of the intake means and the separating conduit 16, and lagging 44 constitute means for heating the oil during the first (and the second) separations.

The intake means collectively designated 32 includes the wave damping means generally designated 46 embodying a set of spaced but interconnected pontoons 48 (FIGS. 6 and 7, the latter of which the interconnecting tie bars 50 are depicted). Such pontoons are generally bi-arcuately sectorial as viewed in plan and arranged in circular ring formation about intake means 32.

In the process which has been described as for use in shallow coastal-waters oil extraction, the collector box 24 is adapted to float in virtue of the surrounding buoyancy promoting arrangement 52 and it is provided with an elongated oil and water intake weir 54 along one side thereof substantially at water level with the box extending below the edge of the weir and having a discharge opening 56 on the opposite side and substantially below the intake edge 58 of the weir, flexible conduit 60 communicating between the box and ship 20 or a collector head 62 (FIG. 16) near the ship into which an array of conduits 60 may extend into a separator conduit 16 as already described.

The foregoing sets forth component parts of the present invention in terms consonant with those of the appended claims.

COMPLETE DESCRIPTION

The control ship 10 exhibits the basic inventive concept. Oil and water enter intake means 32, such intake means comprising a wide shallow funnel 64 of circular or other area at water level 12. The funnel is provided with the steam jacket 42 which is suitably insulated upon the outside at 44. The funnel is extended by chains 66 to the bow crane 68. The ducts 40 from the steam header 38 communicate with jacket 42 around the perimeter of the funnel (FIG. 3). Header 38 is also of course suitably crane or otherwise suspended. Preferably the funnel 64 is provided with the surrounding fence 68 to exclude flotsam. The funnel is centrally or otherwise apertured to provide the discharge port 70 where it communicates with the preferably flexible conduit 72 which conduit, in turn is suitably connected with the central elongated or baffling separating conduit 16.

The conduit 16 extends clear through the ship 10 and is valved at the stern where it may be connected to one or two long hoses which can discharge water or oil either inside of the boom or direct to a waiting tanker. Arrangements are such that according to circumstances, the volume of the oil spill, the availability of tankers in ballast in the area of the spill for example that several alternatives are available in the utilization of the separation conduit 16. Thus for example assuming the control ship of FIG. 1 has an oil capacity of 15,000 tons, if that is the amount of the spill substantially all the oil may be picked up, separated in conduit 16 and fed out to the storage tanks 34. Then, when transference of such oil is desired, for example, when the ship reaches port, the oil can be pumped out of the tanks (which will be suitably inter-connected) through the discharge conduit 74 connected to the pump room 76 to exit at 78. Under another set of conditions, involving a bigger oil spill, it may be desired first to fill the tanks 34 and then, when they are filled to continue the separating process in the main conduit 16 but with the object of filling a waiting tanker with re-claimed oil, such tanker being conduit connected to the stern valve 80 from which, as already indicated, waste or excess water picked up at 32 may also be discharged.

In a third situation, one in which speed of pick-up transcends the importance of effecting the second separation at the time in the conduit 16, the oil and water mixture from the first separation is pumped clear through from 32, through the flexible coupling 82 and the whole length of the separating conduit 16 to be discharged through the stern valve 80. However, in order not to impede the movement of the oil and water mixture, the separating baffles 84 will be slid out of obstructing position as for example in the ways 86. If desired, after the spill has been cleaned up, the oil mixture in the waiting tankers can be reintroduced at the bow end of the control vessel 10, separated in conduit 16 and passed from the tanks 34 through conduit 74 back into the tankers as re-claimed oil.

The conduit 16 extends longitudinally amidship if there is only one. If there are two they will be disposed centrally and symmetrically in parallel. If there are three, the additional two will be disposed on either side of the central conduit. On either side of the oil tanks 34 are sea ballast tanks 88 and within the ships bottom will be additional sea ballast tanks 90. The aforesaid tanks being to achieve the required trim of the vessel having regard for the height of the horizontal plane of the conduit 16 and flexible coupling 82 in relation to sea level 12 (FIG. 1). Although the funnel 36 may rise and fall to a certain limited extent under the influence of the crane 68 (it may also if desired be suitably rendered buoyant as is the collector box 24 of FIG. 14) the extent of vertical freedom of intake means 32 must be related to the dimensions of the vessel. Bow and stern fresh water tanks 90 are so designated, likewise boilers 92, main engine room 94, oil boom stage 96, crew accommodation 98, reconnaissance helicopter 100, main and between decks 102 and 104 and oil pollution equipment stage 106. The crane 68 may if desired be provided with an electronic wave compensator fitted to the starting system to control vertical movement of 32. This material is conventional.

The pontoons 48 of the wave compensator 46 are arranged in the concentric spaced annular formation shown around the first intake means 32, the pontoons being of some 6 feet in depth. They are inter-connected by way of the tie bars 50 which are welded thereto and by the H-beams 108. The H-beams will also assist in the attachment to the pontoons of the funnel 36 of intake means 32. The wave damper is connected by the pair of linkages 110 to the ship's bow 14 for freedom of vertical movement but restraint against lateral movement.

FIGS. 2, 4 and 5 indicate best a section of separation conduit 16, (together with optional duplicate or triplicate conduits 112 and 114 if desired), and the by-pass means to the separation tanks 34 (only called separation tanks inasmuch as it may be expected that a certain small residuum of water will be by-passed thereto from the separation tube 16 to settle at the bottom of such tanks from which it can readily be drawn off by conventional means).

Where necessary the funnel 64 will be steam heated usually with re-claimed oil. The boilers 92 are for the purpose of generating the required steam. Such steam is fed through the main 112 to the funnel jacketting 42 as well as through the ducts 116 to the jacketting 42 of the conduit 16 sections to be returned to the conventional hotwell and boilers by way of the steam traps 118. The several sections of 16 are conventionally bolted together by the face-plates 120. Ducts 116 are suitably valved as at 122. The by-passes to the separation tanks comprise horizontal portions 124 and vertical leg portions 126. Manual valves 128 control the opening and closure of the by-passes. The amount of oil being drawn off can be controlled by the oil/water probe and motorized valve assembly 130. After that the oil passes directly to the tanks.

The baffle plates 84 are preferably set at 45° to the conduit axis. The baffles can be set to project into the conduit to a varying extent according to circumstances and by any conventional means such as tightening upon the ways 86 in which they move in their plane per arrow 134. However, normally, the baffles will project into an 18 inch internal diameter conduit 16 from a minimum of about 2 inches (perpendicular to the conduit axis) at the bow end of the conduit to some 8 inches at the stern end and the reason for this disposition is that oil tends to rise as it heats up which it will do as it moves towards the stern.

With a control ship capability of about 15,000 tons of oil storage capacity it is estimated that under reasonably favourable circumstances the necessary cleanup operation could be effected at a rate of 1,000 tons per hour. Accordingly there is illustrated in FIG. 10 a typical scene of a major oil spill some 12 hours after the event wherein an oil drilling platform 136 is shown after having been struck by the supertanker 138. The outer edge 140 of the oil slick 142 is being gradually corralled by the boom 144. Scraper tugs 146 are shown on stand-by under orders from the control vessel 10 while other similar vessels 148 to one of which is connected the empty tanker 150 work at spaced intervals into the slick which, under the influence of the boom drawn by the tugs 152 is gradually densified and reduced in area. Such an undertaking would most probably be international with other pollution handling vessels en route to the scene. It will be noted that the tugs 146 (FIGS. 8–10) are provided with a skimmer or pusher 154 at the bow which may be adjustably elevated or lowered by the hydraulic motor 156 pivoted at 158 or swung upwardly about said pivot. This is to enable the tug to make speed to the scene of the spill.

FIGS. 11–16 show a modification of the foregoing system generally for use in association with smaller spills and also for use in shallow coastal waters. The vessel 162 is of the "Centiton" class. It is smaller than the vessel 10 and the spills with which it is intended to deal will generally be in the hundreds of tons. Additionally the oily mixture picked up by the intake means 32 is not intended to be heated. However it would be relatively easy to fit steam jacketting to 32 and to the conduit 16, and likewise heating coils in the separation tanks 164 if desired.

Whereas in the first system oil from the intake means 32 is caused to travel in the conduit 16 under the influence of the pump 166, in the present embodiment the oil/water mixture is intended to flow by gravity to the separation baffles 84 (FIG. 15) and is deflected through the perpendicularly disposed by-pass or branch pipes 168 by way of a conventional sight glass and the manual control valves 170 to said tanks. If the oil spill is greater than the separation tanks of the one vessel 162 can handle the polluted oil/water can be pumped directly from the intake means 32 through conduit 16 to the centrifugal pump 172 and through the associated control valve to an empty tanker by way of the stern valve 174.

The level of the intake means 32 can be controlled by the electric crane 176 and by varying the amount of sea water in the fore and aft trim tanks 178 and 180. The actual shallow funnel 182 in this embodiment is preferably of the configuration shown, covered by wire mesh 184 to keep out flotsam and provided with an eye-bolt 186 for hoisting purposes by way of the crane 176, a flexible coupling 188 being provided to permit adjustment.

What has been said to here in connection with the system of FIGS. 11–16 differs very slightly from that of FIGS. 1–10. The main difference is accordingly depicted in FIGS. 14 and 16 from which it will be seen that there is connected ahead of the bow 14 the aforesaid header 62 to which is flexibly coupled separation conduit 16 and in advance of which there radiates the plurality of conduits 60. The vessel 20 may be of the same size as vessel 162 but, on the other hand may be a large vessel such as 10 or larger and it stands off in deep water as has already been explained while the conduits 60 extend into shallow water and terminate in the already described collecting boxes 24.

The collecting boxes are provided with the superposed towing rings 190 and likewise at the ends thereof for anchoring of the power-boats 30. The conduit 60 is held stabilized below water level 192 by the weights 194 at intervals upon the length of the conduit according to circumstances, it being understood that oil is intended to flow by gravity from the boxes to the craft 20 since a gradually shelving sea-floor and a horizontal sea-level will be the case. Nevertheless of course pumping means can if necessary be employed.

As the collecting boxes 24 advance toward the shore 26 against the edge 196 of the oil slick, the oil is reduced in area and the boxes will so advance under the influence of the power-boats 30 and the shore tractors 28. Of course the control ship 20 will likewise move towards shore with them.

To increase the efficiency of separation conduits 16 in small ships, said tubes could be lengthened, if necessary, by laying the same in a generally transverse zig-zag path along the deck so that they would snake from bow to stern across the deck in a single horizontal layer extending from port to starboard and vice versa. This would allow for more baffles to be placed in the separation tubes, and would also allow more time for the oil/-water mixture to separate.

Various modifications may be constructed or performed within the scope of the inventive concept disclosed. Therefore what has been set forth is intended to describe and/or illustrate such concept and is not for the purpose of limiting protection to any herein particularly described embodiment thereof.

What is claimed is:

1. In the separation of oil and water from a spill of oil on a water surface, the apparatus which includes;
a ship having holding tanks therein;
a wide shallow steam-jacketed lagged and peripherally fenced funnel-shaped intake, adjustably outwardly suspended from one end of said ship, said intake having a surrounding wall converging from a large open mouth to a discharge aperture of relatively restricted area therebelow for admitting and separating said oil from said water externally of said ship;
a flexible conduit connecting said discharge aperature to said ship;
a set of spaced but interconnected pontoons arranged in ring formation about said intake to dampen wave action in said water surface adjacent said intake;
a secondary separation means within said ship comprising at least one conduit located longitudinally fore and aft of said ship and connected to said flexible conduit, and having a plurality of baffles thereacross to direct the oil into said holding tanks within said ship;
and mobile anchoring means connected to said intake means for maintaining said intake in position relative to an anchored ship thereby removing any current or wave induced strain from said flexible conduit.

* * * * *